Dec. 16, 1952        H. G. KLEMM        2,621,465
RESILIENT MOUNTING FOR HAY RAKES

Filed April 16, 1949        6 Sheets-Sheet 1

INVENTOR.
HERMAN G. KLEMM
BY H. M. Alexander
& E. J. Herlich
ATTORNEYS

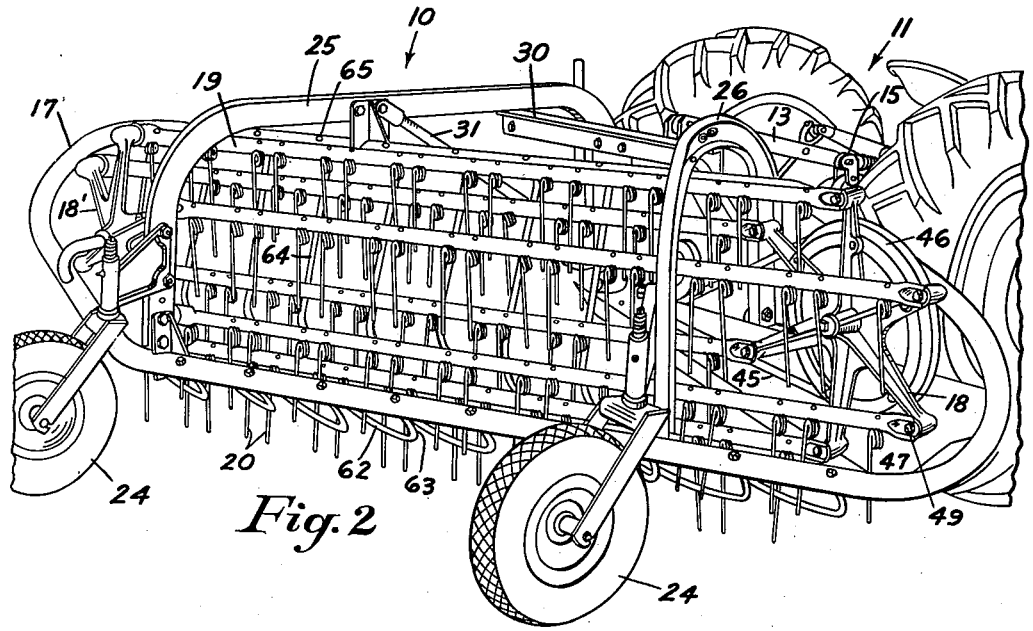
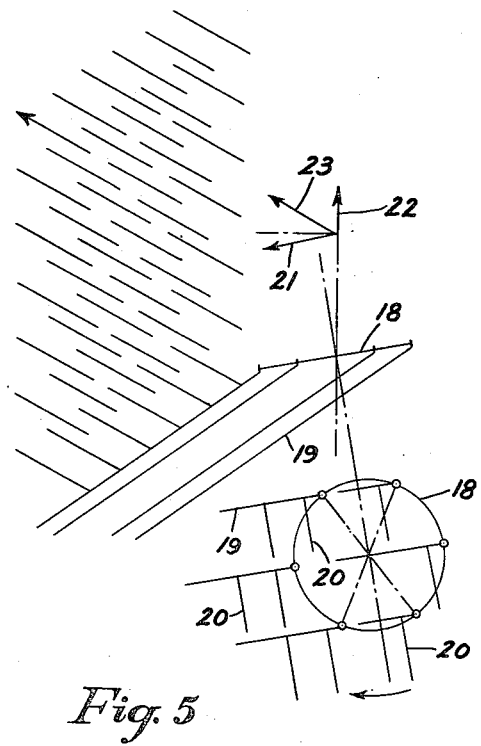

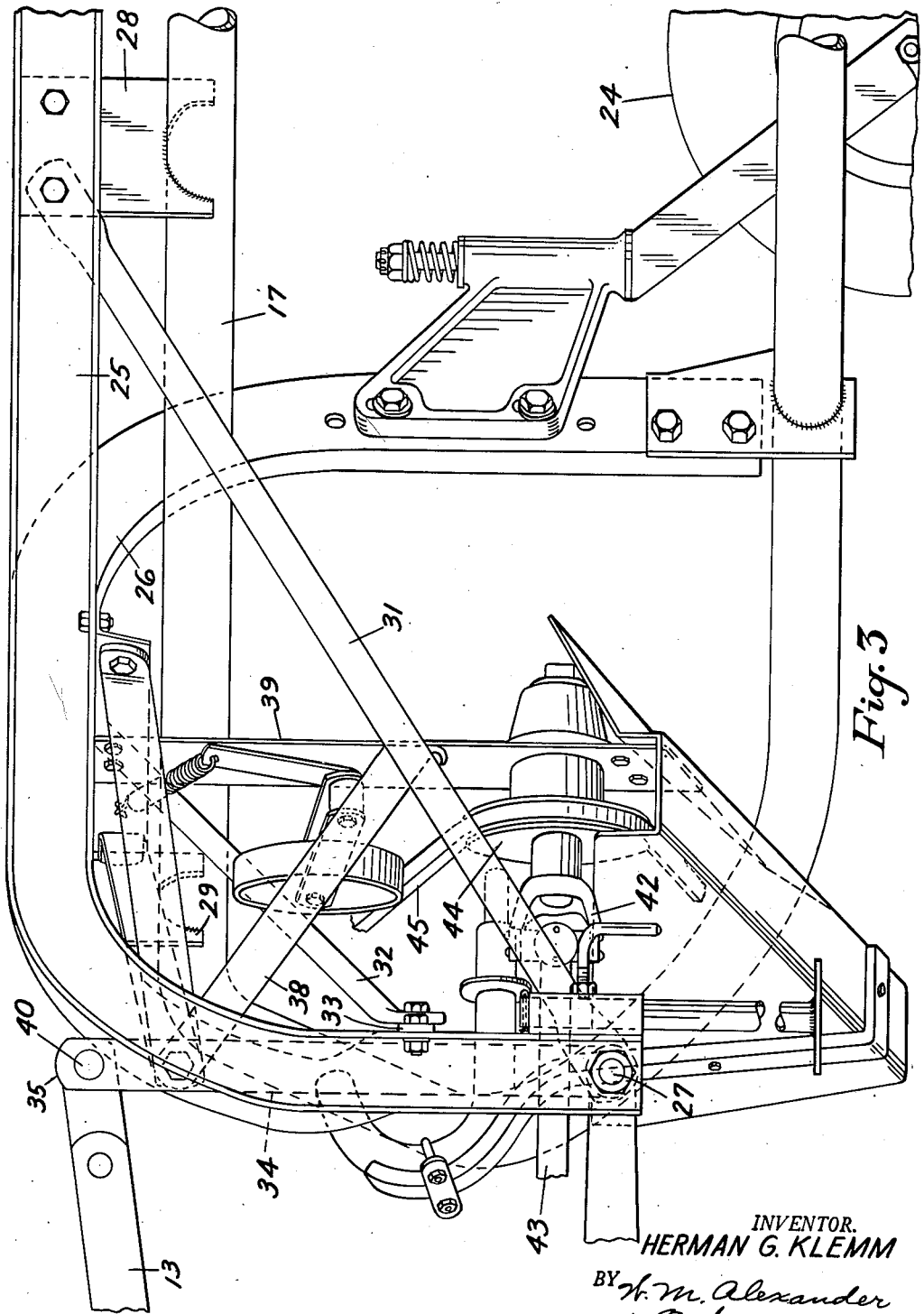

Dec. 16, 1952          H. G. KLEMM          2,621,465

RESILIENT MOUNTING FOR HAY RAKES

Filed April 16, 1949          6 Sheets-Sheet 4

INVENTOR.
HERMAN G. KLEMM

BY W. M. Alexander
& E. J. Werlich
ATTORNEYS

Dec. 16, 1952  H. G. KLEMM  2,621,465
RESILIENT MOUNTING FOR HAY RAKES
Filed April 16, 1949  6 Sheets-Sheet 5
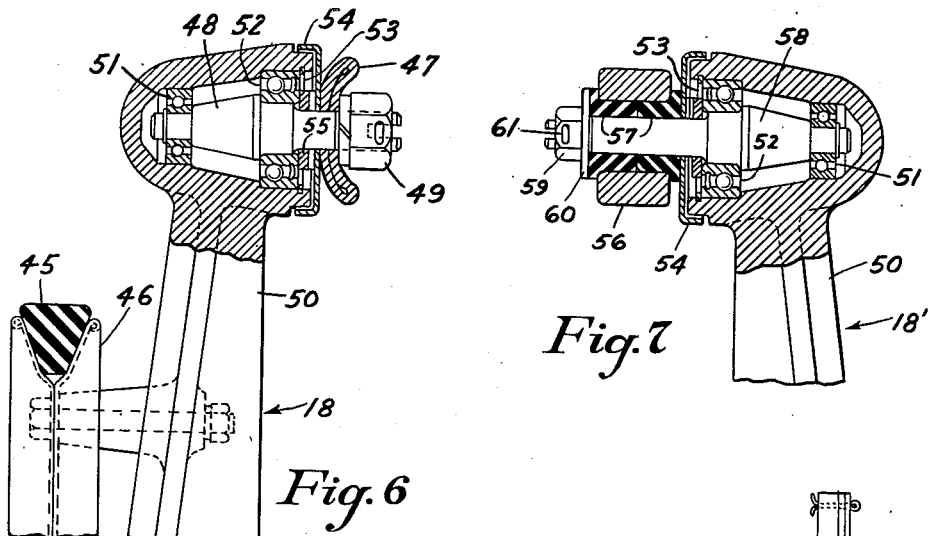
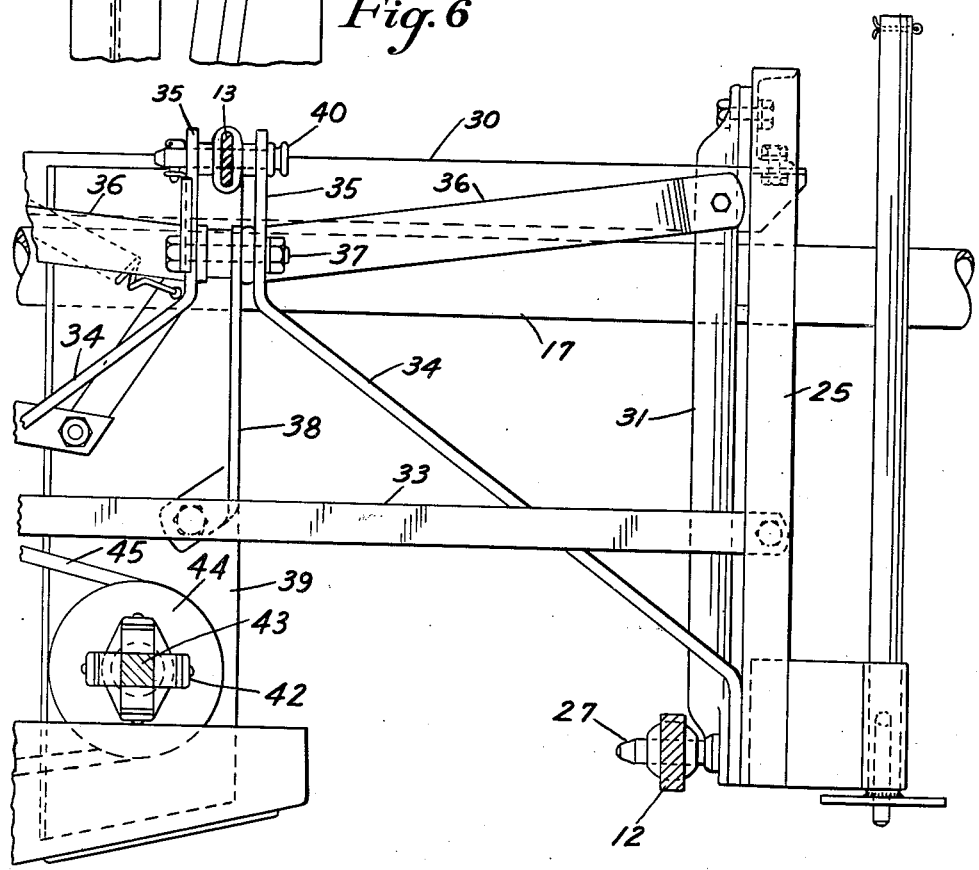
INVENTOR.
HERMAN G. KLEMM
BY H. M. Alexander
& E. J. Herlich
ATTORNEYS

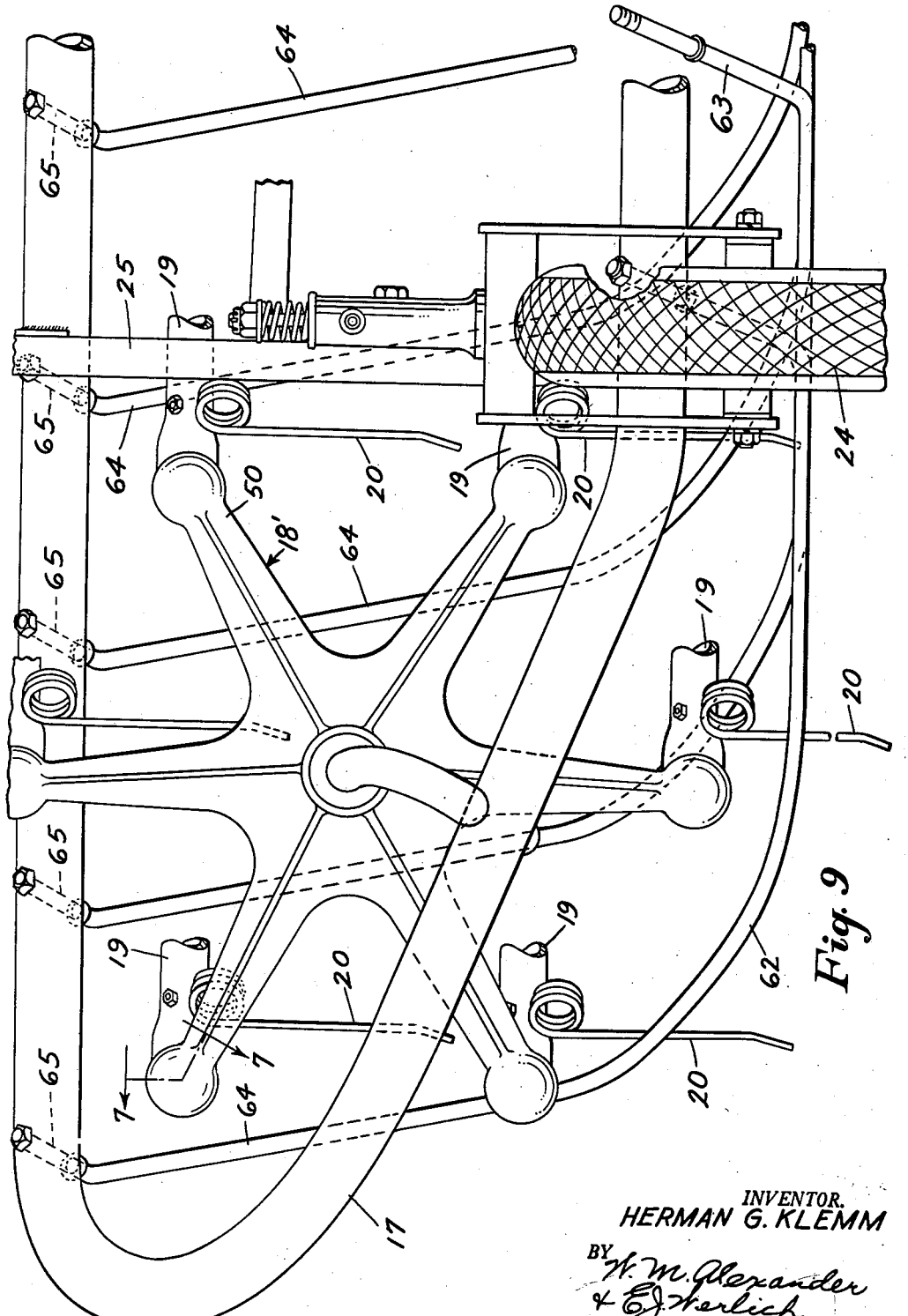

Patented Dec. 16, 1952

2,621,465

UNITED STATES PATENT OFFICE 2,621,465

RESILIENT MOUNTING FOR HAY RAKES

Herman G. Klemm, Birmingham, Mich., assignor to Harry Ferguson, Inc., Detroit, Mich., a corporation of Delaware Application April 16, 1949, Serial No. 87,988

4 Claims. (Cl. 56—377)

1

This application relates to a resilient yielding construction for use with a hay rake. More specifically, it relates to employing such a construction on a side-delivery rake.

In a side-delivery rake the rake bars bow outward or shorten in effect during operation because of centrifugal forces operating on the bars and so attempt to pull the rotating end members closer together. When the end members have non-aligned spaced axes of rotation and the rake bars extend obliquely between the end members, each rake moves in an elliptical path when considered in a plane transverse to its length. Because of the elliptical path the effective centrifugal forces on each bar vary, tending to make outward bowing or the shortening of the bar vary. This action sets up vibrations that are damaging to the connections between the rake bars and the end members. I have discovered that by the use of resilient elastic material in the connections, such as rubber, the rake bars can bow outward in operation without undue stresses in the connections with the end members, and the tendency toward vibrations is reduced through dampening action.

An object of the present invention is to provide a new and improved side-delivery rake of the type in which rake bars extend obliquely between misaligned end members.

A further object is the provision of a novel construction for dampening out vibrations on a side-delivery rake.

Another object is to improve a side-delivery rake by the use of resilient mountings for various parts of the rake.

Further objects and advantages will become apparent as the following description proceeds, taken in connection with the accompanying drawings, in which:

Fig. 2 is a perspective view of the side-delivery rake and a portion of the tractor on a somewhat larger scale than Fig. 1, taken generally from the rear.

Fig. 3 is a side view of a portion of the rake on an enlarged scale taken in the line 3—3 of Fig. 1.

Fig. 5 is a diagram showing the relative velocities and directions of movement of the rake and of individual rake teeth.

2

Figure 4:
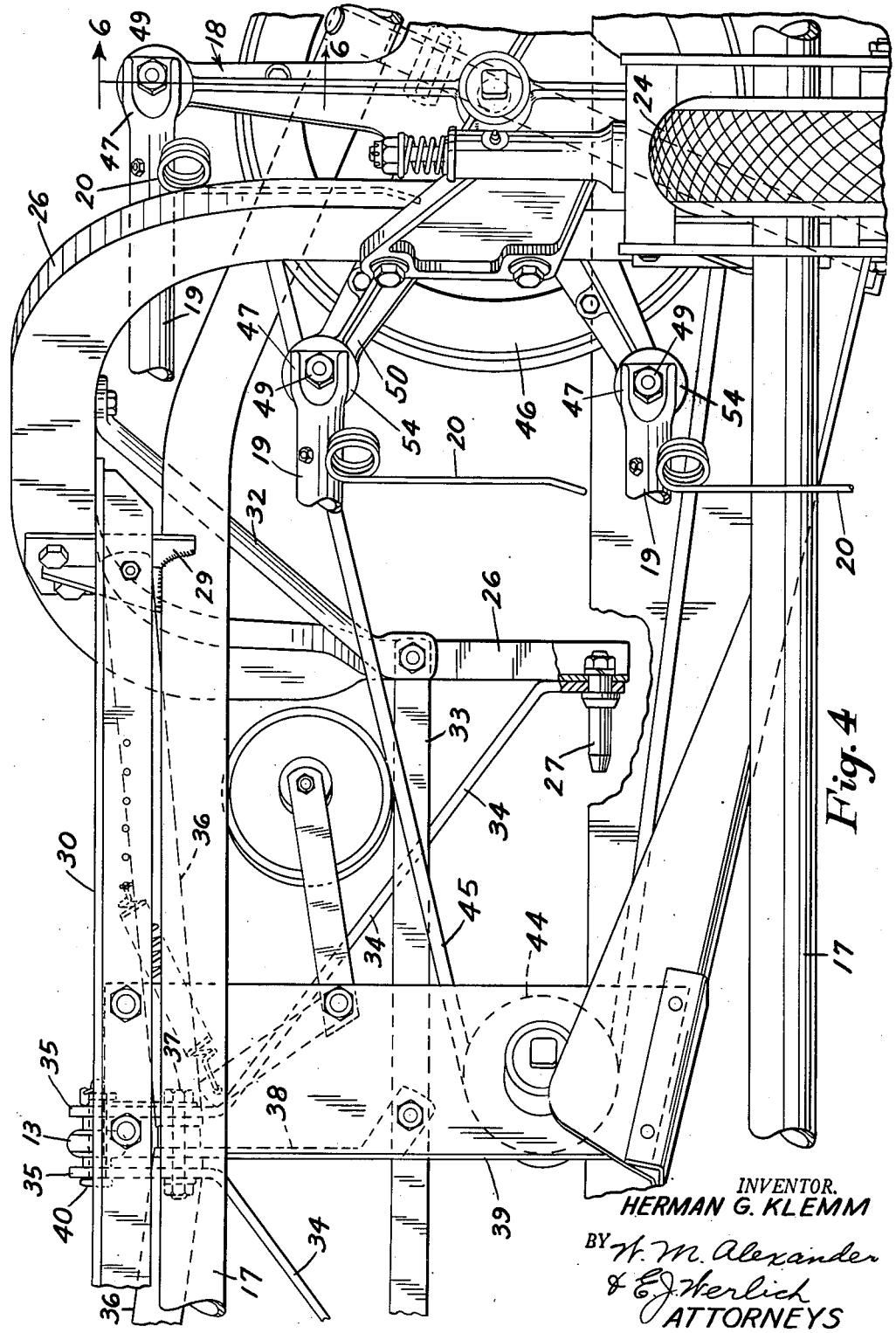
Fig. 4 is a rear view of a portion of the rake on an enlarged scale taken in the line 4—4 of Fig. 1.

Fig. 6 is a sectional view on an enlarged scale taken on the line 6—6 of Fig. 4, showing the connection of a rake bar to the driving end member of the rake.

Fig. 7 is a sectional view on an enlarged scale taken in the line 7—7 of Fig. 9, showing the novel and inventive connection of a rake bar to the driven end member of the rake.

Figure 1:
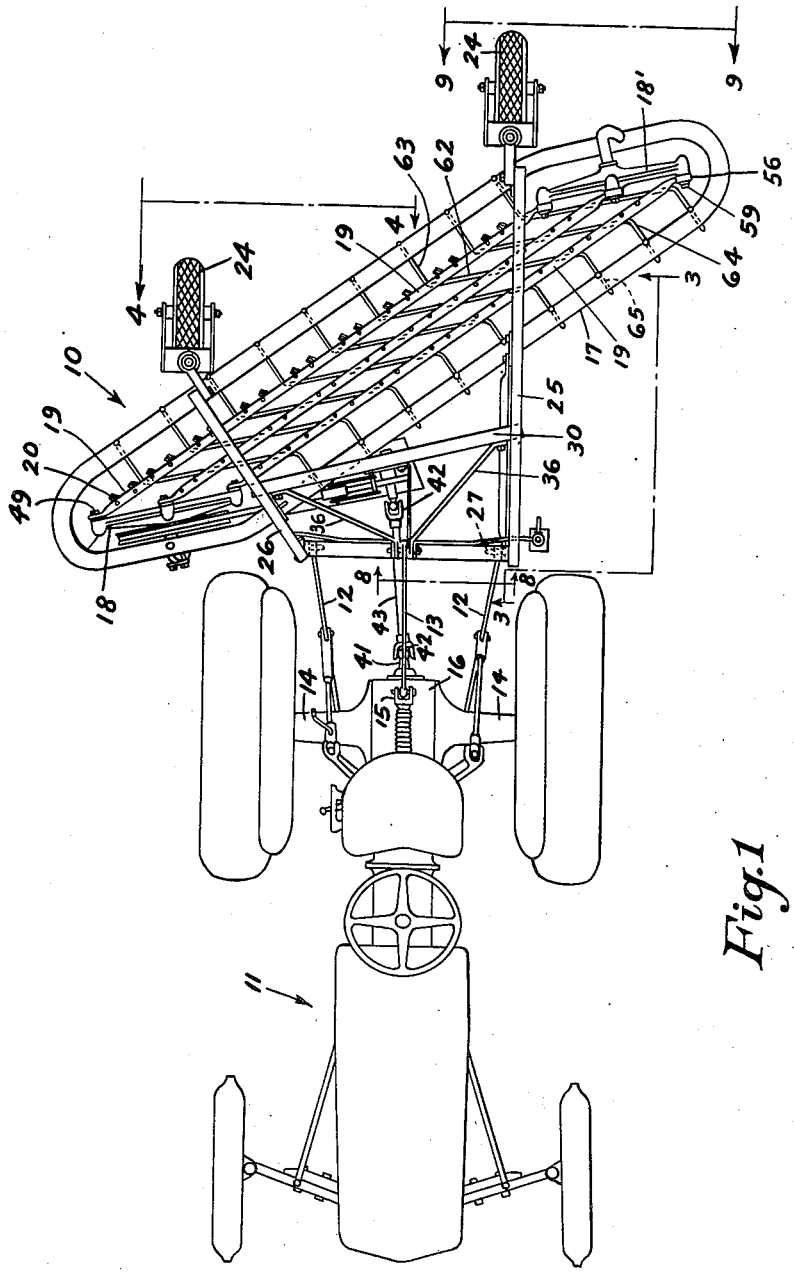
Fig. 1 is a plan view showing a side-delivery rake in which the present invention is incorporated and a tractor to which the rake is connected.

Fig. 8 is a sectional view on an enlarged scale taken in the line 8—8 of Fig. 1.

Fig. 9 is a sectional view on an enlarged scale taken on the line 9—9 of Fig. 1.

Although the invention is susceptible of various modifications and alternative constructions and uses, I have shown in the drawings and shall herein describe in detail the preferred embodiment of the invention. It is to be understood, however, that I do not intend to limit the invention by such disclosure, but mean to cover all modifications and alternative constructions and uses falling within the spirit and scope of the invention as expressed in the appended claims.

As seen in Fig. 1, a rake 10, embodying the novel construction of the present invention to be described presently, is connected to a tractor 11 so as to be towed thereby, through two lower links 12 and an upper link 13. The lower links 12 are pivotally connected to the tractor below and slightly forward of a tractor rear axle 14 and may move laterally of the tractor about these connections to a certain extent. The upper link 13 is pivotally connected to a rocker 15 mounted on a differential casing 16 for the tractor rear axle. The rake 10 comprises an elongated inclined frame 17, a pair of oppositely facing end members 18 and 18', and a plurality of rake bars 19 extending obliquely therebetween and obliquely with respect to the intended direction of travel of the tractor and the rake. The frame 17 likewise extends obliquely to the line of travel in general parallelism with the rake bars.

The end members 18 and 18' are respectively mounted on front and rear ends of the frame for rotation about generally horizontal axes inclined at an angle, in this instance, approximately 10° to the intended direction of movement of tractor and rake. Due to that inclination, the rake bars have during the bottom part of their rotation with the end members, a rearward component of movement along the line of travel of rake and tractor but in the opposite direction. Thus a plurality of rake teeth 20 on each rake bar will tend to move the hay somewhat rearwardly while moving it laterally. This lateral and rearward movement of each rake bar and its teeth is illustrated by a vector 21 in the diagram of Fig. 5, in which the bodily movement of the rake 10 with the tractor is illustrated by a vector 22, and the resultant movement of each rake bar and its teeth, by a vector 23, drawn as the diagonal of a parallelogram having the vectors 21 and 22 as adjoining sides.

The rake frame 17 is supported at the rear on castering ground wheels 24 and at the front on the tractor links 12 and 13 by means of vertical inverted U-members 25 and 26. The U-member 25 has a relatively long base extending in the direction of movement of tractor and rake over the top of the frame 17 and the rake bars 19 and has its rear leg secured to the frame near the juncture of its rear end and rear diagonal side and its front end provided with a lateral pin projection 27 having a universal connection with a lower tractor link 12. The other U-member 26 has on its front leg a similar projection 27 universally connected with the other lower tractor link 12 and a relatively short base extending diagonally over the frame 17 and rake bars 19 so that the one caster wheel 24 connected to the rear leg of the U-member 26 is at least as far out as the rear tractor wheel on that side, the rear leg being secured to an intermediate portion of the rear diagonal side of the rake frame 17. The U-members 25 and 26 are connected to the front diagonal side of the rake frame by members 28 and 29 (Fig. 3). The bases of the U-members 25 and 26 are interconnected by means of an angle member 30. As seen in Fig. 3, a brace 31 extends from the base of the U-member 25 at the member 28 to the projection 27 on the front leg of the U-member. As seen in Fig. 4, a brace 32 connects the base of U-member 26 and the front leg thereof above the projection 27. The front legs of the U-members 25 and 26 are interconnected by a member 33, as seen in Figs. 4 and 8. Members 34 incline upwardly toward one another from connections with front legs of U-members 25 and 26 (Figs. 4 and 8) on the projections 27 across the member 33, to which they are secured as by welding, and terminate in vertical closely spaced portions 35. Diagonally forwardly extending braces 36, connected at their outer rear ends to the member 30, are connected at their inner front ends to the end portions 35 on the members 34 by means of a bolt 37, which also connects to the end portions 35 the front end of a forwardly upwardly inclined brace 38 for a support 39 depending from the member 30. Above the bolt 37 the top tractor link 13 is universally connected by a pin 40 with the end portions 35 on the members 34.

The rake is driven from a power take-off shaft 41 at the rear of the tractor. This shaft is connected through two universal joints 42 and a telescoping shaft 43 with a pulley 44 mounted in the support 39. The pulley 44 is connected by a belt 45 with a pulley 46, bolted to the forward end member 18, as shown in Fig. 6.

Fig. 6 also illustrates the manner in which the rake bars 19 are connected to the front end member 18. Each rake bar is shown to be of tubular construction in Fig. 4 and has a flattened front end 47 through which extends a spindle 48 retained in place by a nut 49. The spindle extends into a radial arm 50 of the end member 18 and is journaled therein by means of spaced ball bearings 51 and 52. A snap ring 53 holds the bearing 52 in place and an enlarged portion on the spindle 48 between the bearings engages the bearing 52 to hold the spindle in place. A dust seal 54 and a washer 55 fit on the spindle 48 between the flattened bar end 47 and the bearing 52.

Fig. 7 illustrates an example of the present invention in the provision of yielding elastic material in the connection of each rake bar 19 to the rear or driven end member 18'. The rear end of each rake bar has secured to it as by welding a ring or eye member 56. Portioned within the ring 56 are two flanged mating bushings 57 formed of a suitable yielding elastic material such as rubber. Through the bushings extends a spindle 58, somewhat similar to spindle 48, but longer because of the combined axial length of the bushings 57. The spindle 58 extends into an arm 50 of the driven end member 18', being journaled in spaced ball bearings 51 and 52. A retaining ring 53 holds the bearing 52 in place and the bearing 52 holds the spindle 58 by engagement with an enlarged portion thereof between the bearings. A dust cap 54 and a washer 55 fit between the bearing 52 and the one bushing 57. A nut 59 threaded on the end of the spindle 58 and a washer 60 clamp the bushings 57 tightly against the dust cap 54 or compresses the bushings to provide a tight fit between the bushings, the spindle, and the ring 56 on the end of the rake bar. A cotter pin 61 holds the nut 59 against rotation.

In operation, the front end member 18 of the rake is driven from the power take-off. The front end member drives the rake bars 19 which in turn drive the rear end member 18'. Since the axes of the end members are angled toward the side of the rake, and the rake bars extend obliquely between the end members at an angle to the planes of the end members appreciably less than a right angle, the rake bars move bodily about the end members but do not rotate about their own axes. Thus the rake teeth 20 are maintained in a generally vertical depending position. Since each rake bar is held against rotation about its own and yet moves bodily with the end members, there must be relative rotation between the rake bars and the end members. The bearings 51 and 52 journaling the spindles 48 and 58 in the end member arms 50 provide for such rotation.

Since the rake bars extend obliquely between the end members, the rake bars move in an elliptical path when considered in a plane transverse to the direction of the rake bars. Thus the centrifugal forces tending to make the rake bars bow outwardly vary, and so the rake bars not only tend to pull the end members toward one another but also tend to do this in varying amounts. Moreover the tendency of the rake bars to bow outward varies, because in one part of each revolution gravity acts in the same direction as the centrifugal force, and in another part of each revolution gravity acts in the opposite direction. This varying action upon the rake bars tends to set up vibrations in the rake, which are destructive to the connections between the rake bars and the end members. The yielding elastic bushing means 57 in the connections between the rake bars and one end member reduces these destructive vibrations, and also gives or yields the necessary amount to accommodate the effective shortening of the rake bars due to bowing. Also the bushing means 57 can compensate for dimensional variations in the rake bars and the end members apart from bowing.

The raking action of the rake teeth 20 comes when the bars 19 are moved through the lower part of their revolutions. During this movement rake teeth move along strippers curved central portions 62 of strippers parallel to the paths of the rake teeth. The strippers also have end portions 63 extending through and secured to the lower rear side of the frame 17 at right angles thereto and portions 64, which do the actual stripping, extending generally transverse to the upper forward side of the frame and terminating in bent ends extending through the forward side and secured thereto.

I claim as my invention:

1. A side-delivery rake comprising a pair of rotatable end members having parallel axes of rotation laterally and axially displaced from one another, a plurality of rake bar members having connections at opposite ends with the respective end members effective to hold the bar members against rotation about their axes while moving bodily with the end members about the axes of the end members, the connection of each rake bar member with each end member comprising a spindle rotatably mounted in the end member in general parallelism with the axis of the end member, and a resilient yielding bushing interposed between at least one of the spindles and the rake bar member.

2. A side delivery rake comprising a pair of rotatable end members having parallel axes of rotation laterally and axially displaced from one another, a plurality of rake bar members having connections at opposite ends with the respective end members effective to hold the bar members against rotation about their axes while moving bodily with the end members about the axes of the end members, the connection of each rake bar member with each end member comprising a spindle rotatably mounted in the end member in general parallelism with the axis of the end member, and a resilient yielding bushing interposed between one only of the spindles and the rake bar member.

3. A side delivery rake comprising, in combination, a pair of rotatable end members having parallel axes of rotation laterally and axially displaced from one another, a plurality of rake bar members having connections at opposite ends with the respective end members restraining said bar members against rotation about their own longitudinal axes and constraining them to move bodily in a closed path defined by the rotation of said end members, the connection of each said rake bar member with one of said end members comprising a spindle operatively connected to said rake bar member and said one end member and having its longitudinal axis disposed generally parallel to the rotation axis of said one end member, a bearing interposed between the spindle and one of the members with which it is connected, and a resilient bushing interposed between the spindle and the other of the members with which it is connected.

4. A side delivery rake comprising, in combination, a pair of rotatable end members having parallel axes of rotation laterally and axially displaced from one another, a plurality of rake bar members having connections at opposite ends with the respective end members restraining said bar members against rotation about their own longitudinal axes and constraining them to move bodily in a closed path defined by the rotation of said end members, the connection of each said rake bar member with one of said end members comprising a spindle operatively connected to said rake bar member and said one end member and having its longitudinal axis disposed generally parallel to the rotational axis of said one end member, a resilient bushing disposed in surrounding relation to said spindle and housed within said rake bar member, and an anti-friction bearing also disposed in surrounding relation to said spindle and housed within one of the members with which the spindle is operatively connected.

HERMAN G. KLEMM.

REFERENCES CITED

The following references are of record in the file of this patent:

UNITED STATES PATENTS

| Number | Name | Date |
| --- | --- | --- |
| 818,899 | Martin | Apr. 24, 1906 |
| 935,456 | Blackstone et al. | Sept. 28, 1909 |
| 1,224,876 | Bamford | May 1, 1917 |
| 1,871,918 | Rossman | Aug. 16, 1932 |
| 2,040,692 | Hitchcock | May 12, 1936 |
| 2,065,080 | Lee | Dec. 22, 1936 |
| 2,367,832 | Riesing | Jan. 23, 1945 |
| 2,515,360 | Vail | July 18, 1950 |